United States Patent [19]

Briscoe et al.

[11] Patent Number: 5,920,870
[45] Date of Patent: Jul. 6, 1999

[54] MULTI-LAYER ABSTRACTION BUCKET MECHANISM

[75] Inventors: Roy A. Briscoe, Haverhill; Robert J. Burke, Northboro; Thomas E. Hanson, Ashland; Paul Holland, Natick, all of Mass.; John M. Moriarty, Nashua, N.H.

[73] Assignee: Wang Laboratories, Inc., Billerica, Mass.

[21] Appl. No.: 08/912,380

[22] Filed: Aug. 18, 1997

Related U.S. Application Data

[63] Continuation-in-part of application No. 08/653,952, May 22, 1996, Pat. No. 5,696,961.

[51] Int. Cl.⁶ .................................................. G06F 17/30
[52] U.S. Cl. .......................................... 707/103; 707/104
[58] Field of Search ..................................... 707/103, 104

[56] References Cited

U.S. PATENT DOCUMENTS

| | | | |
|---|---|---|---|
| 4,613,946 | 9/1986 | Forman | 364/518 |
| 4,853,843 | 8/1989 | Ecklund | 364/200 |
| 5,202,985 | 4/1993 | Goyal | 707/103 |
| 5,210,870 | 5/1993 | Baum et al. | 707/103 |
| 5,297,279 | 3/1994 | Bannon et al. | 707/103 |
| 5,301,105 | 4/1994 | Cummings, Jr. | 364/401 |
| 5,437,027 | 7/1995 | Bannon et al. | 707/103 |
| 5,481,712 | 1/1996 | Silver et al. | 395/700 |
| 5,524,202 | 6/1996 | Yokoyama | 395/161 |
| 5,530,883 | 6/1996 | Baum et al. | 395/800 |
| 5,537,603 | 7/1996 | Baum et al. | 395/800 |
| 5,537,604 | 7/1996 | Baum et al. | 395/800 |
| 5,537,622 | 7/1996 | Baum et al. | 395/800 |
| 5,548,769 | 8/1996 | Baum et al. | 395/800 |
| 5,590,362 | 12/1996 | Baum et al. | 395/800 |

*Primary Examiner*—Thomas G. Black
*Assistant Examiner*—Frantz Coby
*Attorney, Agent, or Firm*—Ronald J. Paglierani; Gary D. Clapp

[57] ABSTRACT

A multi-layer abstraction bucket mechanism connected between applications programs and at least one data source and providing to the users transformations of data and the results of processes performed on the data. The multi-layer abstraction bucket mechanism includes hierarchically connected abstraction layers, each including a methods object for storing methods for performing operations on data received from a data bucket of a hierarchically next lower abstraction layer, a data operation object for selecting a method to be executed by the method object, a data bucket for storing the results of an executed method, and a map for storing information for constructing the data bucket and for relating requests to methods residing in the methods object. The mechanism includes a data extraction layer and an abstraction layer. At least one abstraction layer is a data transformation layer while others include a data processing layer and a rules transformation layer for performing the rule based decision operations. At least one abstraction layer is an encaching layer while others are data transitory.

13 Claims, 12 Drawing Sheets

PROPERTIES 72

Bucket Type: 72a
Patient
Provider          Session
Dept              Dictionary
Location
Organization
Admin
Misc

Bucket Object: 72b
Bucket Object To Use.

Bucket Action: 72c
Delete            Get Buckets
Insert            Get Objects
Select            Get Members
Update            Get Methods
Connect           Doc_InsertPage
Disconnect        Doc_AddPage
Add UIMember      Add Member
Add Condition     Add Sort
Clear             Clear Cache

Bucket Object Member: 72d
Members depend on which object is selected

Bucket Object Member Data:
Member's Data (from the database) 72e

Bucket Object Member Type:
Members Type (from the map) 72f

Bucket Object Member Length:
Members Max Length (from the map) 72g

UI Type: 74a
None (Default)    Combo Box
ListBox           Grid
Drop Down List

UI Member: 74b
Member(s) to display in UI

UI Delimiter: 74c
Delimiter between columns

UI Row: 74d  UI Col: 74e
Row of UI         Column of UI

UI MaxRows: 74f
Max Rows

UI Text: 74g
Text to put in UI row and col or text from UI row and col.

Sort: 78a
Ascending (default)
Descending

Sort Member: 78b
Object member to perform sort on.

Condition Operator: 80a
<, >, =, like

Condition Member: 80b
Object member to apply condition to.

Condition Text: 80c
Text for condition compare. date > 3/31/95, descrip like choler

FIG. 4A

PROPERTIES 72

Row: 82
Data Row

Col: 84
Data Column

MaxRows: 86
MaxRows of Data

MaxCols: 88
MaxColumns of Data

Status: 90
Status results of an Action.

Status String: 92
String corresponding to the Status.

SQLStmt: 94
SQL statement to be used.

Cache Type: 96
Until next request (default)
File

Cache Duration: 98
Rules for keeping cache

Cache Max data objects: 100
Max number of data objects

Default Member: 102
Object member to perform sort for default display row.

Default Text: 104
Text to search on for default display.

FIG. 4B

MULTI-LAYER ABSTRACTION BUCKET MECHANISM

CROSS REFERENCES TO RELATED APPLICATIONS

The present Patent Application is a continuation in part of U.S. patent application Ser. No. 08/653,952, filed May 22, 1996 now U.S. Pat. No. 5,696,961 by Roy A. Briscoe et al. for a Multiple Database Access Server for Application Programs, since allowed.

FIELD OF THE INVENTION

The present invention relates to an apparatus and method for accessing and processing data from original data sources and, more particularly, to a method and apparatus for the multi-layered abstraction and transformation of both the form of the data and the processes performed with or upon the data.

BACKGROUND OF THE INVENTION

A primary feature of the development of computer systems and applications programs in recent years has been the increasing degree of interoperability between applications programs and, in particular, the degree to which applications programs can communicate and share data. It is now commonly expected that a given application program will be able to communicate and exchange data, and even calls for functional operations, with a number of other programs and a number of different approaches have been developed to provide such interoperability. One of the earliest approaches, for example, was the development of suites of applications programs, such as Lotus 1-2-3, that effectively comprised a single application program with an extensive array of functions, such as word processing, spreadsheets, databases and communications. A later approach was the development of operating systems, such as Microsoft Windows, that provided an integrated operating environment wherein applications programs that conformed to the environment are thereby able to exchange and integrate data between themselves.

A recurring problem in achieving integration between applications programs, however, is that it is often difficult or impossible, for many different practical reasons, such as economics or competitive efforts, to design programs to operate together directly. Although integrated operating environments offer some solutions for these problems, the problem remains because not all designers choose to fully conform with the operating environment. Even when applications programs do fully conform with an integrated operating environment, however, the results have been unsatisfactory because the degree and type of integration between applications programs is dictated by the operating environment, which may not provide the integration facilities required in a particular instance and which, in fact, may merely interpose additional interfaces and mismatches to be overcome. Further, the degree and types of integration provided by integrated operating environments are dictated by the operating environments, which are designed to provide only generalized integration facilities usable by a wide range of applications programs. As such, the data integration facilities of integrated operating environments often do not meet the needs of a particular application program or user and the user or application program is forced to adapt to the integrated operating environment, rather than the operating environment adapting to the user or application program.

This problem has been particularly acute with regard to interfacing between applications programs and databases, although it is a common feature in many systems that many of the applications programs executing therein will obtain the data that they work with from one or more common databases of different types. While the prior art has offered many approaches to the problem of database access by applications programs, these approaches have been generally unsatisfactory. Many, for example, depend upon the applications programs and the database programs being originally designed to work together, which is often not possible as the applications programs and databases are designed a different times and by different developers, or depend upon the facilities provided by an integrated operating environment, with the limitations and problems described above.

Still other solutions of the prior art have provided translation interfaces to be interposed between the applications programs and the database programs. These approaches have likewise been generally unsatisfactory, however, as they have required modifications to either the applications programs or the database programs and have thereby required that either applications programs or the database programs have knowledge of the data and command formats and functions of the other program. These approaches are further unsatisfactory in that the translations interfaces are generally specific to a given application or database program or set of programs and it is frequently difficult to adapt the translation interface to additional applications programs or database programs.

Still other approaches of the prior art include what are referred to as "rapid application development" (RAD) tools that provide programmatic interfaces to databases, such as Microsoft's Visual Basic or Borland's Delphi programs.

These approaches have been unsatisfactory, however, in many instances because, while the user is not required to be concerned with the detailed "back end" of database processing, that is, the actual creation of Structured Query Language (SQL) statements, the user is still required to have detailed knowledge of the database design, such as the tables, the table columns, the relationships between tables, and what groups of tables comprise a "data object". Also, and because the user is required to be knowledgeable of and involved in the details of data processing at each step of the processes that must be performed to achieve a desired object, it is very difficult for a user to create a system performing complex, multiple operations.

The present invention provides a solution to these and other problems of the prior art.

SUMMARY OF THE INVENTION

The present invention is directed to a multi-layer abstraction bucket mechanism for use in a computer system including a processor for performing operations on data and a memory for storing programs for controlling operations of the processor and the data. According to the present invention, the multi-layer abstraction bucket mechanism is connected between applications programs executing on the computer under direction of users and at least one data source containing data for providing access to the data by the users and providing to the users transformations of data and of processes performed on the data.

The multi-layer abstraction bucket mechanism of the present invention includes a plurality of hierarchically connected abstraction layers, wherein each abstraction layer includes a methods object for storing methods for operating on data and performing corresponding operations on data received from a data bucket of a hierarchically next lower abstraction layer, a data operation object responsive to a request for an operation to be performed on the data received from the next lower abstraction layer for selecting a corresponding method to be executed by the method object, a data bucket for storing the results of a method executed by the methods object and providing the results as data to a hierarchically next higher abstraction layer, and a map connected to the data operation object and to the methods object for storing information for constructing the data bucket and for relating requests for operations to methods residing in the methods object.

According to the present invention, the multi-layer abstraction bucket mechanism includes a data extraction layer connected from at least one data source for receiving data from the at least one data source, wherein the methods object of the data extraction layer includes methods for extracting data from the at least one data source, and an abstraction layer connected to provide the results stored in the data bucket thereof to a user.

Further according to the present invention, at least one abstraction layer is a data transformation layer that executes methods for performing data transformation operations upon data received from the next lower abstraction layer, while other layers may include a data processing layer that executes methods for performing data processing operations upon data received from the next lower abstraction layer to generate new data from the data received from the next lower abstraction layer. Still other layers may include a rules transformation layer that executes methods for performing rule based decision operations upon data received from the next lower abstraction layer and that includes an associated a set of user defined rules for performing the rule based decision operations.

In other aspects of the present invention, at least one abstraction layer is an encaching layer wherein the results of an operation performed on data from a next lower abstraction layer are stored in the data object for use in a plurality of operations by the abstraction layer, while other layers are data transitory wherein the results of operations are essentially resident only until passed to a next layer.

In further embodiments of the present invention, the multi-layer abstraction bucket mechanism may include a data source reader connected between the data extraction layer and a data source for reading the data from the data source, or a set of externally defined rules defining processes to be performed on data by an abstraction layer and a process reader for reading the set of externally defined rules.

In yet further embodiments, the multi-layer abstraction bucket mechanism may include an interface schema for providing the results from at least one abstraction layer to a plurality of users, an object editor for defining and editing data buckets, or a map editor for defining and editing the maps

DESCRIPTION OF THE DRAWINGS

The foregoing and other objects, features and advantages of the present invention will be apparent from the following description of the invention and embodiments thereof, as illustrated in the accompanying figures, wherein:

FIG. 4 is a diagrammatic representation of application interface properties of the present invention;

DESCRIPTION OF THE INVENTION

1. General Description (FIG. 1)

Figure 1A:
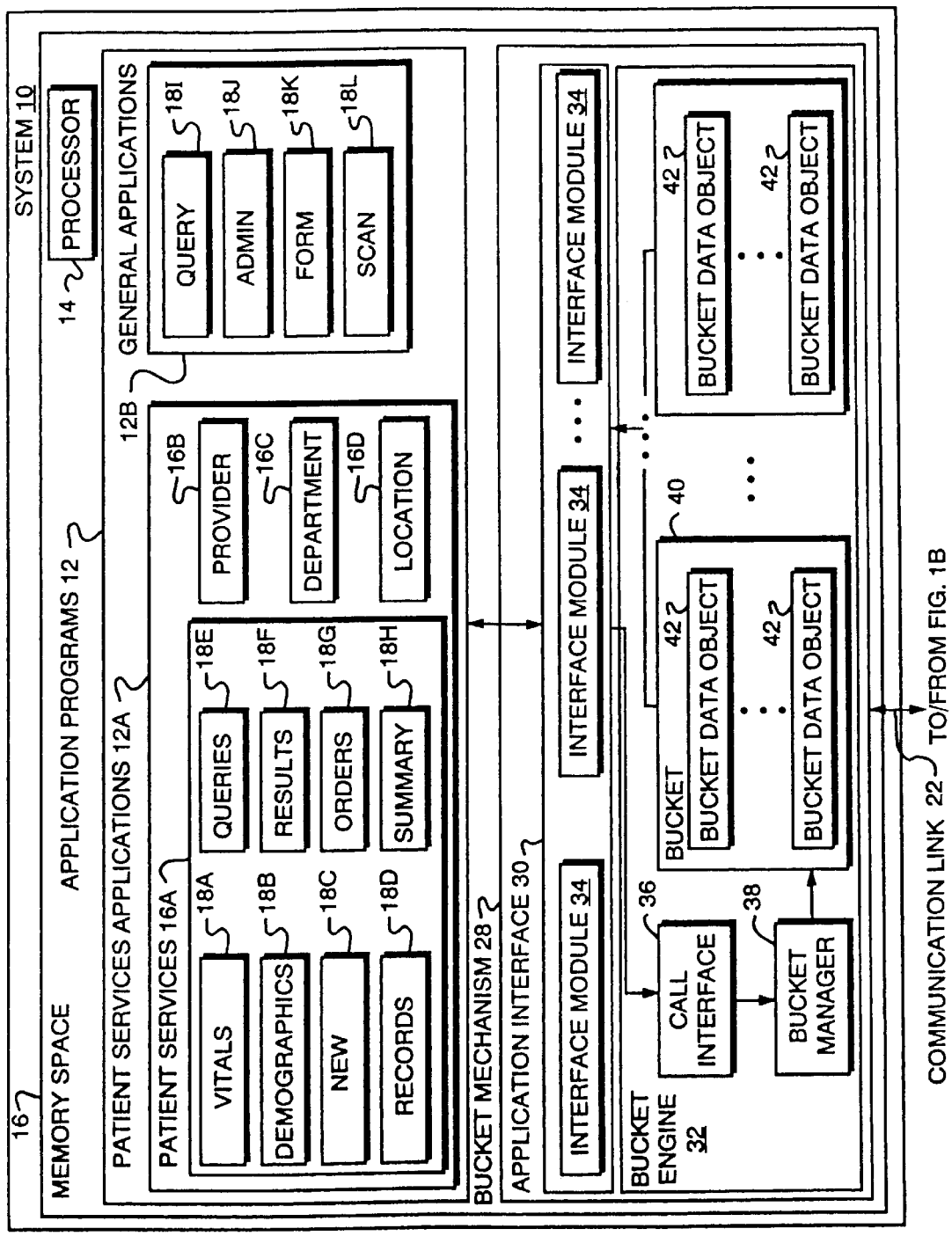
FIG. 1 is a diagrammatic representation of a system incorporating the present invention.
Figure 1B:
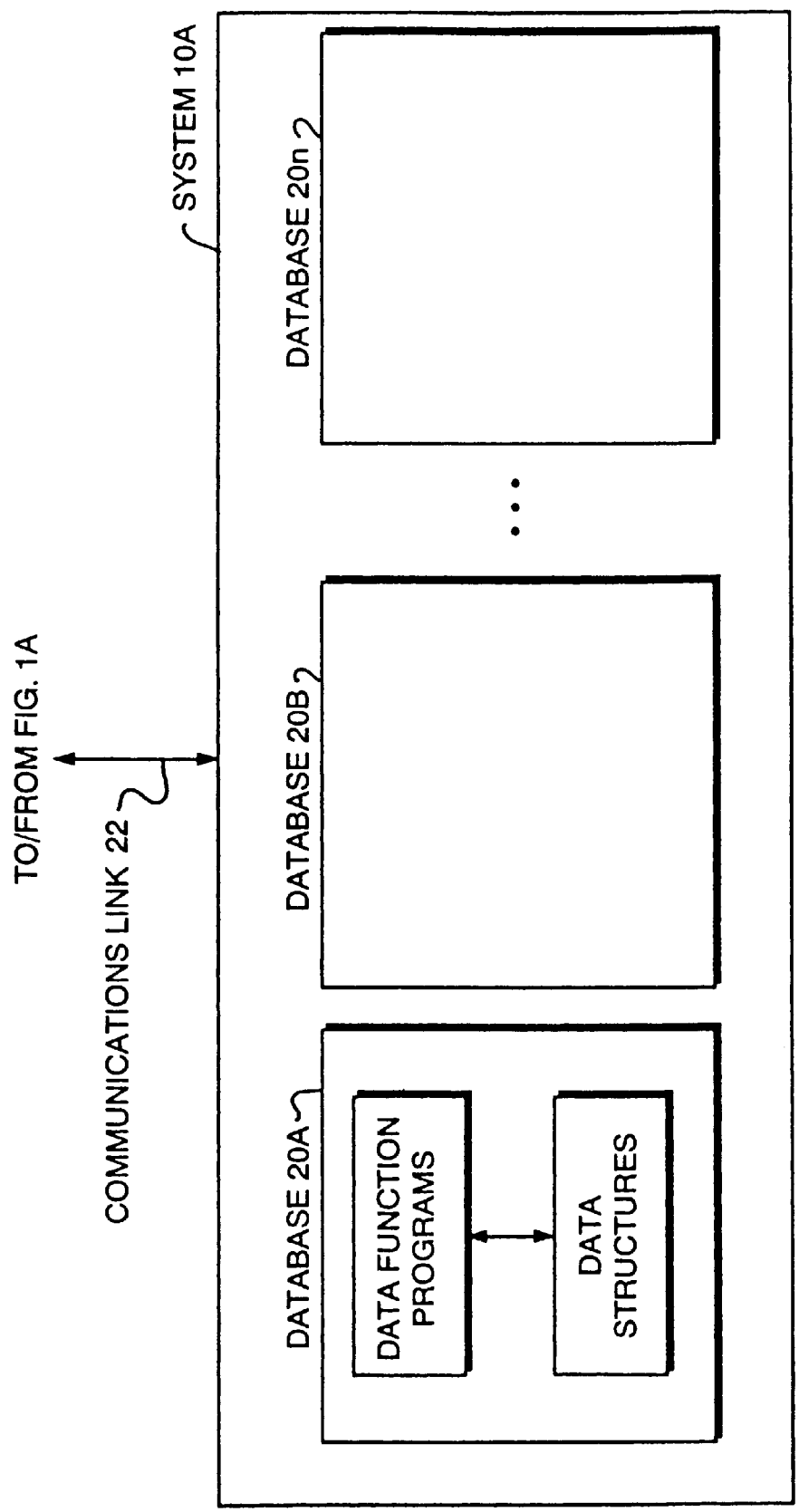

Referring to FIG. 1, therein is shown a diagrammatic block diagram of the present invention as implemented in a System 10, which is typically a personal computer or, in the alternative, a mini or mainframe computer with a plurality of workstations, and wherein a plurality of Applications Programs 12 are executing on a Processor 14 and in the Memory Space 16 of System 10 and access Databases 20 to read data from and write data to Database 20.

In a present exemplary implementation of System 10, System 10 may, for example, be a medical administration System as might be used in a hospital, clinic or medical office, but may be any system having an application program or programs accessing databases. In this example, however, and by way of illustration, Applications Programs 12 may include Patient Services Applications 12A as well as General Applications 12B. Patient Services Applications 12A may, for example, include such applications as Patient Information Applications 16A, Provider Applications (Provider) 16B, Clinic Applications (Department) 16C and Facility Applications (Location) 16D wherein these applications may be implemented as separate applications or as functional components of an integrated medical services application. Patient Information Applications 16A may, in turn, include applications programs or utilities for entering, displaying and managing or editing such information as patient vital signs (Vitals) 18A, patient demographics (Demographics) 18B, a utility for generating a new patient transaction or action or to enter a new type of information (New) 18C, Patient Records (Records) 18D, Patient Queries (Queries) 18E, patient Laboratory Results (Results) 18F, Treatment and Medicine Orders (Orders) 18G and Summarized Information (Summary) 18H. General Applications 12B, in turn, may include an Ad Hoc Query Engine (Query) 18I for formulating queries to the database and displaying the results of such queries, Administrative Programs and Functions (ADMIN) 18J, a form building program (Form) 18K and a document scanner (SCAN) 18L. As will be apparent to those of skill in the relevant arts, General Applications 12B may include still further applications programs, such as word processing programs, spreadsheet programs, graphics programs, electronic mail programs.

Database 20, in turn, may be comprised of one or more Databases 20A, 20B, . . . 20n and may reside on System 10 or on a System 10A or a plurality of Systems 10A connected to System 10 through a Communications Link 22, such as a Wide Area Network or a Local Area Network. In other embodiments, however, and as well understood by those of ordinary skill in the relevant arts, one or more of Databases 20A–n may reside in System 10, for example, wherein System 10 is personal computer (PC), a minicomputer or a mainframe computer, while others may reside on one or more Systems 10A. As indicated in FIG. 1, each Database 20 will generally include the Data Structures 24 for storing the data and a plurality of Data Function Programs 26 for accessing, reading, writing, and managing Data Structures 24.

As discussed previously, each of Databases 20A–n will generally have been designed to accept database commands or queries in formats and syntaxes that may be particular to each database and to accept and provide data in formats and syntaxes that may be particular to each database. According to the present invention, the internal structures and functional elements of Databases 20A–n are not modified in any way and Databases 20A–n are not functionally aware of particular operations of the sources of requests for database operations or of the sources or destinations of data. Each of Databases 20A–n will instead receive database commands or queries in the formats and syntaxes particular to the database and will accept and provide data in the formats and syntaxes particular to the database.

Further according to the present invention, each of Applications Programs 12 likewise will generally have been designed to generate database related requests, calls or commands in formats and syntaxes that may be particular to the application program, and to accept and provide data in formats and syntaxes that may be particular to the application program. According to the present invention, the internal structures and functional elements of Applications Programs 12 are not modified in any way and Applications Programs 12 are likewise not functionally aware of the particular operations of the destinations of requests for database operations or data or the sources of data. Instead, each of Applications Programs 12 will generate database related requests in the formats and syntaxes particular to the application program and will receive and provide data in the formats ands syntaxes particular to the application program.

According to the present invention, therefore, each of Applications Programs 12 and Databases 20A–n is fully and completely functionally insulated from the other and neither of Applications Programs 12 or Databases 20A–n is modified in any way to operate together. Each of Applications Programs 12 and Databases 20A–n operates in its native manner and mode, and to receive and provide commands, requests and data as if interfaced with, respectively, a database or application program tailored to its particular operations and interfaces.

2. General Description of Bucket Mechanism 28 (FIG. 1)

According to the present invention, the operational bridge or interface between Applications Programs 12 and Databases 20A–n that insulates Applications Programs 12 from Databases 20A–n while providing full database functionality to Applications Programs 12 is provided by Bucket Mechanism 28, which includes an Application Interfaces 30 and a Bucket Engine 32. As will be described in further detail below, Application Interfaces 30 is a functional interface between Applications Programs 12 and Bucket Engine 32, communicating with Applications Programs 12 according to their native formats and syntaxes, while Bucket Engine 32 executes the database requests with respect to Databases 20A–n, communicating with Databases 20A–n according to their native formats and syntaxes.

Bucket Mechanism 28 thereby effectively provides a "middle layer" between Applications Programs 12 and Databases 20A–n that frees the user, that is, Applications Programs 12, from having to have knowledge of the designs of Databases 20A–n and of the specific syntaxes, formats and protocols for performing database operations. As will be described below, Bucket Mechanism 28 uses database object and map table mechanisms, which are essentially series of instructions for any given database object for any given database, to perform database operations in response to requests, commands and queries in the native terms of Applications Programs 12.

As will be described in detail in the following, Bucket Mechanism 28 provides the programmer and user with a simple interface to Databases 20A–n that groups the databases into logical categories called "buckets", which are large groups of classes of database tables, that contain "bucket objects", which are small groups of database tables, and "members", which are database table columns or a group of database columns.

In addition to providing an interface to Applications Programs 12, and thus to the programmer and user, Bucket Mechanism 28 allows the construction of ad hoc query tools as the bucket, bucket object and member mechanism provide a link between the query tool and the databases wherein the user or programmer is not required to have knowledge of the databases. Bucket Mechanism 28 also allows the generation of database data groupings that are not usual in database operations, such as grouping by current date, current time and aging.

As will also be described further below, Bucket Mechanism 28 further provides flexibility in where the major components of Bucket Mechanism 28 reside in a system. Considering the data path to consist, from "top" to "bottom", of Applications Programs 12, the data extracted from the databases, the Structured Query Language (SQL) queries, and the database, the mechanisms of the present invention may be implemented in a standalone system wherein the Application Programs, data, SQL queries, and database reside in a single system, such as a desktop or laptop system or a single minicomputer or mainframe computer. Likewise, the present invention can be implemented in several forms in client/server systems, for example, wherein the Applications Programs 12, the data and the SQL queries reside on a client and the databases reside on a server, or wherein the Applications Programs 12 and the data reside on a client while the SQL queries and databases reside on a server, or wherein the Applications Programs 12 reside on a client and the data, SQL queries and databases reside on a server.

In a presently preferred embodiment of the present invention, Application Interfaces 30 and Bucket Engine 32 are implemented using object oriented programming techniques executing in the Microsoft Windows operating environment. The following descriptions will therefore assume Microsoft Windows as the operating environment for the present invention, together with the functionality and capabilities of Microsoft Windows, and will conform to the conventions of object oriented programming and the Microsoft Windows operating environment in describing the present invention. The functionality and capabilities of Microsoft Windows are well known to those in the relevant arts and is well described in readily available publications, such as "Windows 3.1 Programmer's Reference" by James W. McCord and published by Que Corporation and "Inside OLE 2" by Kraig Brockschmidt and published by Microsoft Press, as are the techniques, methods and facilities for object oriented programming. Those of skill in the relevant arts will therefore readily understand from the following description of the present invention how to implement the present invention, as well as how to adapt the present invention to other operating system environments, such as New Wave, Macintosh[1] and UNIX.

[1]Macintosh is a trademark of Apple Computer Corporation.

First considering Application Interfaces 30 and Bucket Engine 32 on a general level and as illustrated in FIG. 1, Application Interfaces 30 receives requests, commands or calls, hereafter generically referred to as "requests", for database operations from Applications Programs 12, each in the format and syntax native to the requesting Applications Program 12, and, as described in the following, transforms each such request or command into one or more interface calls to Bucket Engine 32. Application Interfaces 30 also includes the facilities and functions to create, manage and execute certain user interface functions related to database operations. As indicated in FIG. 1, therefore, Application Interfaces 30 includes an Interface Module 34 for and corresponding to each type of Applications Program 12 wherein a type of Applications Program 12 may include one or more Applications Programs 12 which share a common database operation syntax and format, or a set of database syntaxes and formats that may be included within a single Interface Module 34.

Bucket Engine 32, in turn, communicates and operates with each of Databases 20A–n in the formats and syntaxes native to the Databases 20A–n to perform the requested operations. Bucket Engine 32 receives the results of each database operation from Databases 20A–n, again in the formats and syntaxes native to the Databases 20A–n, and communicates and operates with Application Interfaces 30 to return the results of each requested operation to the requesting Applications Program 12.

Figure 2:
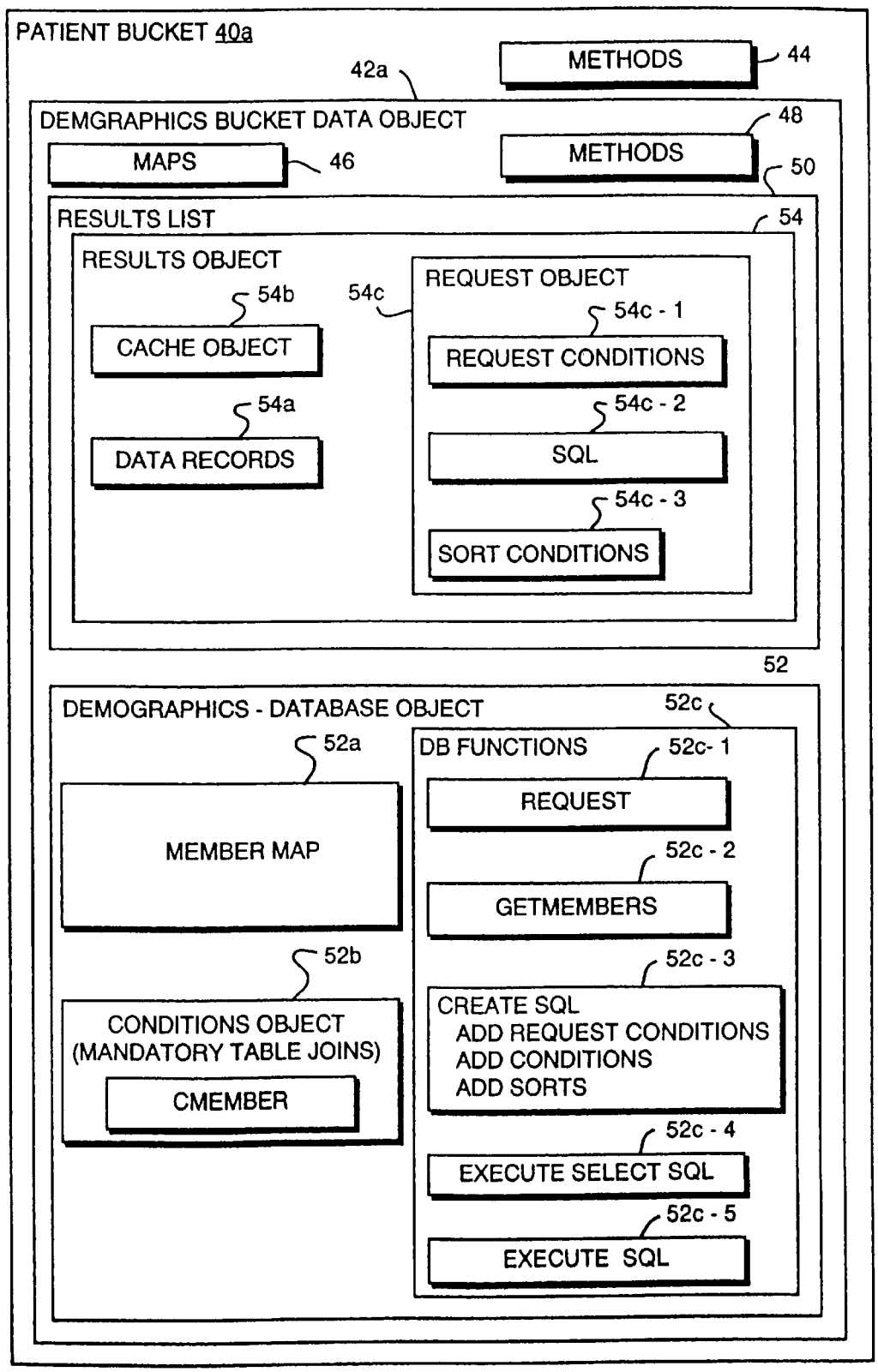
FIG. 2 is a diagrammatic representation of a bucket and bucket object of the present invention.

3. Buckets 40 and Bucket Data Objects 42 (FIGS. 1 and 2)

In the present implementation, Bucket Engine 32 is implemented as a dynamic linked library (dll) that includes a Call Interface 36 to Application Interfaces 30 and a Bucket Manager 38 to create Buckets 40 and Bucket Data Objects 42 as required. According to the present invention, and in conformity with object oriented programming techniques, a Bucket 40 corresponds to a class or grouping of related information while a Bucket Data Object 42 is a member of a Bucket 40 class and contains information belonging to that class or grouping of related information. Stated another way, a Bucket 40 is a logical grouping of database information which creates a multi-level hierarchy of Bucket Data Objects 42 from a relational database, such as one of Databases 20A–n. For example, and as will be described in the following, in the present exemplary System 10 Bucket Manager 38 will create Buckets 40 corresponding to the classes or groupings of information previously identified with respect to Patient Services Applications 12A as Clinic, Facility, Provider and Patient information. Bucket Manager 38 will also create buckets corresponding to each of the application programs or types of information used by the General Applications 12B that perform database operations.

As will be described in the following, Bucket Manager 38 will create Buckets 40 and Bucket Data Objects 42 through 42n for use with any type of Database 20, that is, with any database syntax and format known to Bucket Manager 38 and, for this purpose, stores information relating to the construction of Buckets 40 and Bucket Data Objects 42 for each type of Database 20 currently known to Bucket Manager 38. In this regard, and as also described below, new types of databases and bucket objects may be easily added to Bucket Manager 38.

For purposes of data integrity, the present implementation of the present invention creates and maintains a single instance of Bucket Engine 32, and thus of Bucket Manager 38, on a System 10 at any given time, and one copy of each Bucket Data Object 42 on a System 10 at any given time. All Applications Programs 12 executing on the System 10 and all functions of those Applications Programs 12 will thereby access Databases 20 through the single instance of Bucket Engine 32 and Bucket Manager 38 and will access the single copy of a given Bucket Data Object 42.

Further in this regard, Bucket Manager 38 will create Buckets 40 and Bucket Data Objects 42 when information is requested from or written to a Bucket 40 and a Bucket Data Object 42 by an Applications Program 12 and will create new Buckets 40 or Bucket Data Objects 42 only when a new Bucket 40 or Bucket Data Object 42 is necessary to meet the requirements of a particular database request.

Buckets 40 and Bucket Data Objects 42 are thus created dynamically and there can be a virtually unlimited number of different types of Buckets 40 and Bucket Data Objects 42, depending upon the needs of Applications Programs 12 and the number and types of Databases 20A–n. As such, the present implementation does not store or hard code specific instances of Buckets 40 or Bucket Data Objects 42, but instead maintains a Bucket 40 object class and a Bucket Data Object 42 object class and, when a Bucket 40 object or a Bucket Data Object 42 object is created, it is initialized with an instruction set, or set of methods, which define what the object is and how it behaves.

Bucket 40 objects, are therefore initialized with the instruction set "Objects", reflecting that the function of Buckets 40 is to create and manage and operate upon Bucket Data Objects 42. Bucket Data Objects 42 are, in turn, initialized with the instruction sets instructions sets and table maps, as will be defined below. As will be described in further detail below, the instruction sets and table maps define the structures and functions of Bucket Data Objects 42 and the interrelationships of the structures and functions of Bucket Data Objects 42 with the data structures and database operations of Databases 20A–n and the user. The instruction sets and table maps thereby reflect and define the correlation between the characteristics and properties of a particular Bucket Data Object 42 type, a particular corresponding Application Program 12 and a particular Database 20. It will therefore be apparent, as from the previous descriptions of the present invention, that there can be a Bucket Data Object 42 type for each pairing of an Application Program 12 and one of Databases 20A–n. Finally, the table maps and instruction sets define the initial mandatory and selected characteristics and operations of the Bucket Data Object 42 and the hierarchical relationships between Bucket Data Objects 42 within a given Bucket 40 class.

The relationship of Buckets 40 and Bucket Data Objects 42 is further illustrated in FIG. 2, which shows a Bucket 40a of the class Patient and corresponding to a particular patient. Bucket 40a is illustrated therein as containing a Bucket Data Object 42a of a class Demographics and a Database Object 52 defining database members appearing in Bucket Data Object 42a and the relationship between Bucket Data Object 42a and the data structures and database operations of Databases 20A–n. As will be described in the following, and according to the present invention, each Bucket 40 or Bucket Data Object 42 may contain further Bucket Data Objects 42 in a hierarchical relationship of Bucket Data Objects 42 defined for a particular Application Program 12 and Database 20 by the information stored in Bucket Manager 38.

As illustrated in FIG. 2, and as will be described in further detail in following descriptions, a Bucket 40, such as Patient Bucket 40a, contains a set of Methods 44 defining operations that may be performed by the Bucket 40 object, such as creating Bucket Data Objects 42, a Maps 46 for holding information relating the Bucket 40 to Databases 20A–n, and, in this example, a Demographics Bucket Data Object 42a. Demographics Bucket Data Object 42a, in turn, and as representative of Bucket Data Objects 42, contains a set of Methods 48 defining operations that may be performed by the Bucket Data Object 42, a Results List 50, and a Database Object 52 for holding methods, conditions and functions for accessing Databases 20A–n.

As also illustrated, and as typical of Results Lists 50 of Bucket Data Objects 42, Results List 50 contains a Results Object 54 which includes Data Records 54a for holding a record of the results of a database operation, for example, as a character string containing data from the included members of Databases 20A–n, and a Cache Object 54b for holding information pertaining to the Bucket Data Object 42a for subsequent use, such as the extracted Database 20A–n data or the conditions and methods to be used in creating the Bucket Data Object 42a, and information identifying where in System 10 the cached information is stored. A Results Object 54 further includes a Request Object 54c for storing the request generated by an Applications Program 12 that resulted in the creation of the Bucket Data Object 42. As shown, a Results Object 54 includes a Request Conditions 54c-1 for storing information pertaining to the request, such as a patient identification, a SQL 54c-2 for storing the SQL query comprising the request, if the user provided an SQL query as a request, and a Sort Conditions 54c-3 for storing information provided in the request regarding how the database results are to be sorted in responding to the request.

Demographics Database Object 52, in turn, and as illustrative of Database Objects 52, includes a Member Map 52a for holding information defining the members, or data, of Databases 20A–n that are to appear in the Bucket Data Object 42, for example, in Data Records 54a and a Conditions Object 52b for holding mandatory defining relationships between information in the Bucket Data Object 42a and information in the Databases 20A–n.

Demographics Database Object 52 further includes a Database (DB) Functions 52d, which generally includes the methods to be used for performing database operations, such as insert, update, delete, and so on. As indicated in FIG. 2, the DB Functions 52c of a Database Object 52 includes a Request 52c-1, which identifying the original request that resulted in the creation of the Bucket Data Object 42, a Getmembers 52c-2, including the methods for selecting and incorporating members, that is, Database 20A–n information, that is to be contained in the parent Bucket Data Object 42a, and the methods to be used for performing database operations, such as insert, update, delete, and so on. DB Functions 52c farther include a Create SQL 52c-3 containing information for creating an database query, an Execute Select SQL 52c-4 for creating the database query statement, such as an SQL statement, and an Execute SQL 52c-5 for accessing Databases 20A–n.

As will be apparent, a Bucket 40 may include still further Bucket Data Objects 42 containing further groups or types of information. For example, a Patient Bucket Data Object 42a may also have Bucket Data Objects 42b–n corresponding to Provider(s) 16B, patient Vitals 18A, patient Orders 18G and Lab Results 18F, as discussed previously with regard to Patent Applications 12A. Likewise, it will be apparent that a given Bucket Data Object 42 such a Demographics Bucket Data Object 42a may contain different numbers and types of subsidiary Bucket Data Objects 42, depending upon the particular design, implementation and purpose of a particular Bucket Data Object 42 or System 10.

4. Detailed Descriptions

A. Bucket Mechanism 28 (FIG. 3)

Figure 3:
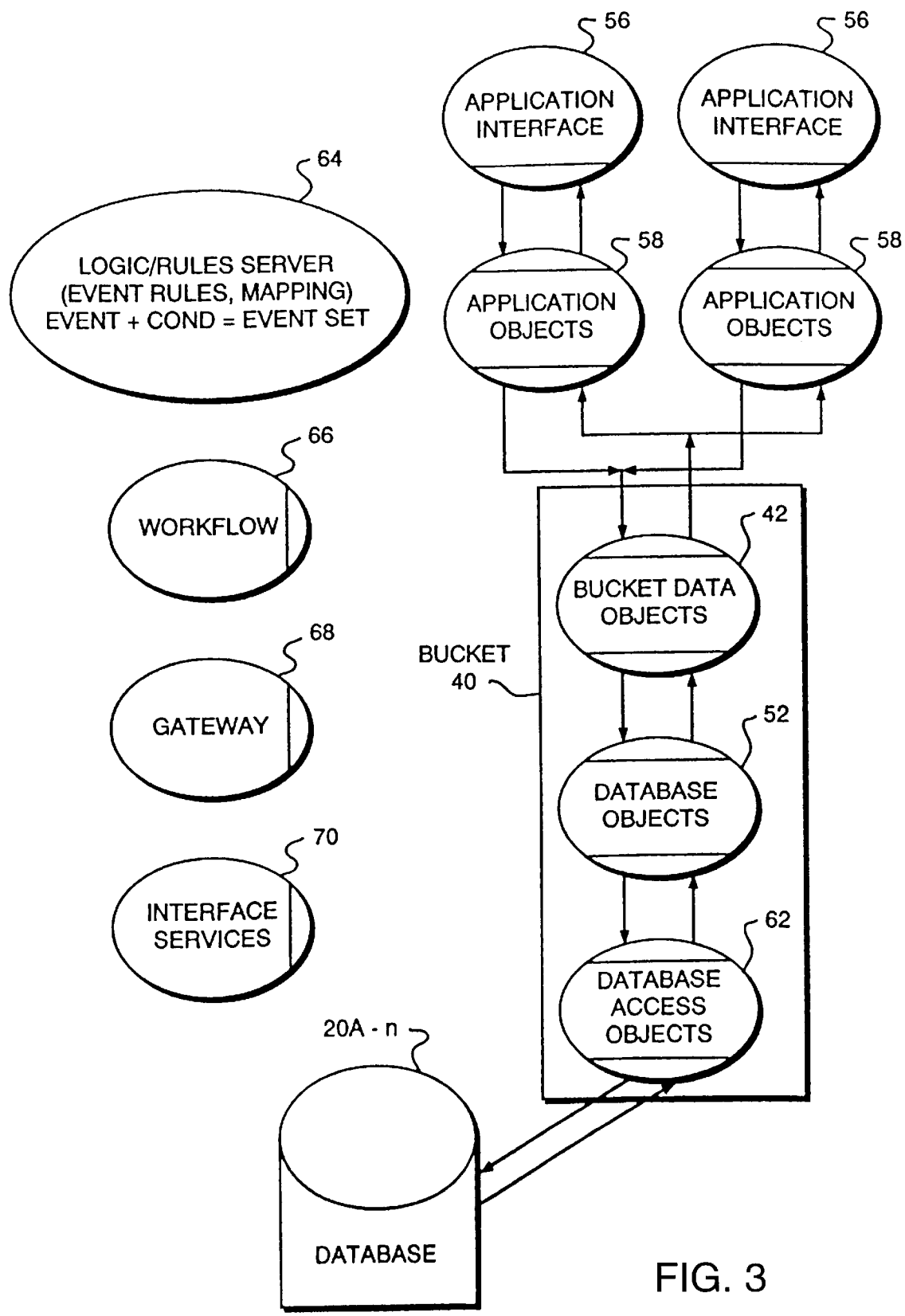
FIG. 3 is a diagrammatic object based representation of the present invention.

Referring now to FIG. 3, therein is shown a further diagrammatic representation of Bucket Mechanism 38 of the present invention as implemented in an object oriented system.

As illustrated therein, Bucket Mechanism 38 of the present invention includes Application Interfaces 30 of FIG. 1 and are the interfaces for each of Applications Programs 12. Application Interfaces 30, in turn, interface with corresponding Application Objects 58, which execute logic, methods and operations in support of a corresponding Application Interfaces 30. In general, there will be at least one Application Object 58 for each Application Interfaces 30 and an example of an Application Object 58, using the present example of a medical services system, would be an appointment list. As will be described below, a given Application Object 58 will in turn have one or more associated data objects, such as one or more patient data objects and one or more provider data objects.

As indicated in FIG. 3, a Bucket 40 contains one or more Bucket Data Objects 42 wherein each Bucket Data Object 42 interfaces with Application Objects 58 to hold, manage and cache data for each Application Program 12. As indicated in FIG. 3, multiple instances of Applications Programs 12 and corresponding Application Interfaces 30 and Application Objects 58 may simultaneously share and access a single Bucket Data Object 42 and, while multiple instances of a given Bucket Object 42 may exist across the system in a variety of topologies, there will be only one instance of a given Bucket Data Object 42 within a system. A given Bucket Object 42 may, however, contain more than one results object, that is, instance of real data, and Application Objects 58 can "talk" to more than one Bucket Data Object 42.

As also illustrated in FIG. 3, Buckets 40 further include Database Objects 52 interface with Application Objects 58 and Data Access Objects 62, to map the Bucket Data Objects 42 to various data access methods, such as SQL query generation programs and utilities in Database Access Objects 62 and to members of Databases 20A–n.

Database Access Objects 62 of a Bucket 40, in turn, interfaces with the Databases 20A–n and accesses the databases and returns the results to Database Objects 52 and thus to the requesting Bucket Data Objects 42 and the requesting Applications Programs 12.

It will be noted in FIG. 3 that there are a number of components of the bucket mechanism of the present invention that are represented as not being connected in the direct data path from Application Interfaces 30 and through Application Objects 58, Bucket Data Objects 42, Database Objects 52 and Database Access Objects 62 to Databases 20A–n. These components include Rules Server 64 which contains the application logic and business rules and methods that can be separated from the user interface and shared across multiple instances of a given application program or across multiple applications programs. In the system of the present invention, multiple Rules Servers 64 can be supported in a given system wherein each Rules Server 64 may support a different functional grouping of Applications Programs 12 or users, such as different departments or system users. Rules Server 64 would usually be accessed from Applications Objects 58 or from, for example, Gateway 68, described below.

Workflow Component 66, in turn, performs similar tasks as Rules Server 64, but supports workflow processes in the system. The division between Workflow Component 66 and Rules Server 64 depends upon the particular capabilities and functions of Workflow Component 66 and Rules Server 64 as implemented in the system.

Lastly, Gateway 66 supports communications between the bucket mechanism and outside Applications Programs 12 and other data repositories while Interface Services 70 comprises an interface component and set of interface object classes used within the bucket mechanism components to facilitate communication between the bucket mechanism components. The services provided by Interface Services 70 includes supporting named services across networks and well as local interface services, such as communication between dynamic linked libraries.

Finally, it will be noted in FIG. 3 that each object therein is represented by an oval enclosure with the communications between objects represented by lines connecting certain of the objects. It will also be noted that certain of the object boundaries wherein the communications lines connect to the objects are marked off from the body of an object by an additional line within the object boundaries. These marked off points of connection indicate functional and operational boundaries, or borders, whereat the objects may be physically and functionally separated from one another, for example, with one object at one end of a communication connection residing on one physical or functional component of the system, such as a client, and the object at the other end of the communication connection residing on a different physical or functional component of the system, such as a server. It is therefore apparent, as earlier discussed, that the physical and functional topology of the system of the present invention is readily adaptable to a wide variety of different physical, geographic and functional topologies.

B. Application Interfaces 30 (FIGS. 1, 3 and 4)

As described with reference to FIG. 1, Application Interfaces 30 is comprised of a plurality of Interface Modules 34 wherein there is an Interface Module 34 for and corresponding to each type of Applications Program 12 that performs database operations. Each Interface Module 34 Application Interfaces 30 receives requests for database operations from the corresponding Applications Program 12 or Applications Programs 12, each request being in the format and syntax native to the requesting Applications Program 12, and transforms each such request or command into one or more interface calls to Bucket Engine 32. The Interface Module 34 that receives a request for a database operation from an Applications Program 12 then receives the results of the request, if any, from Bucket Engine 32 and returns the results to the requesting Applications Program 12. As also described, Application Interfaces 30 further includes the facilities and functions to create, manage and execute certain user interface functions related to database operations.

As described with reference to FIG. 3, Application Interfaces 30, like Bucket Engine 32, is presently implemented in an objected based system as a library of programs, utilities and functions that are used in common to perform the operations of Interface Modules 34 and is thereby best described in terms of the properties and characteristics of the requests and Bucket Engine 32 calls dealt with by Application Interfaces 30.

Referring to FIG. 4, therefore, therein is illustrated certain of the Properties 72 dealt with by Application Interfaces 30. As represented therein, these properties may include a plurality of User Interface Properties (UIs) 74a–g, each of which defines one or more properties of the user interface, as indicated by the entries in the illustrated UIs 74a–g.

Other of Properties 68 include Buckets 76a–g pertaining to and defining aspects of Bucket Data Objects 42, such as the type and identification of a bucket object, the action requested, and the member, that is, database column, and database data, type and length involved in or resulting from the request.

Still others of Properties 68 pertain to and define the mandatory or selectable conditions of the Bucket Data Object 42, such as Sort 78a–b pertaining to sorting or ordering of the member(s) from the database, Condition 80a–c defining conditions pertaining to the database operations, and Row 82, Column 84, MaxRows 86 and MaxCols 88 delimiting the rows and columns of the member(s) from the database.

Others of Properties 68, such as Status 90 and Status String 92 pertain to the status of a database action and another, SQMStmt 94, identifies the SQL statement used in a current database action; that is, a user can supply an SQL statement rather than using the normal facilities of Bucket Mechanism 28. Still others of Properties 68, such as Cache Type 96, Cache Duration 98 and Cache Max 100, pertain to caching of the corresponding Bucket Data Object 42 while others, such as Default Member 102 and Default Text 104 are used when the results set display mechanism is some sort of user interface, such as a combination box or a list box, and describe the default database member row to be displayed.

Figure 6:
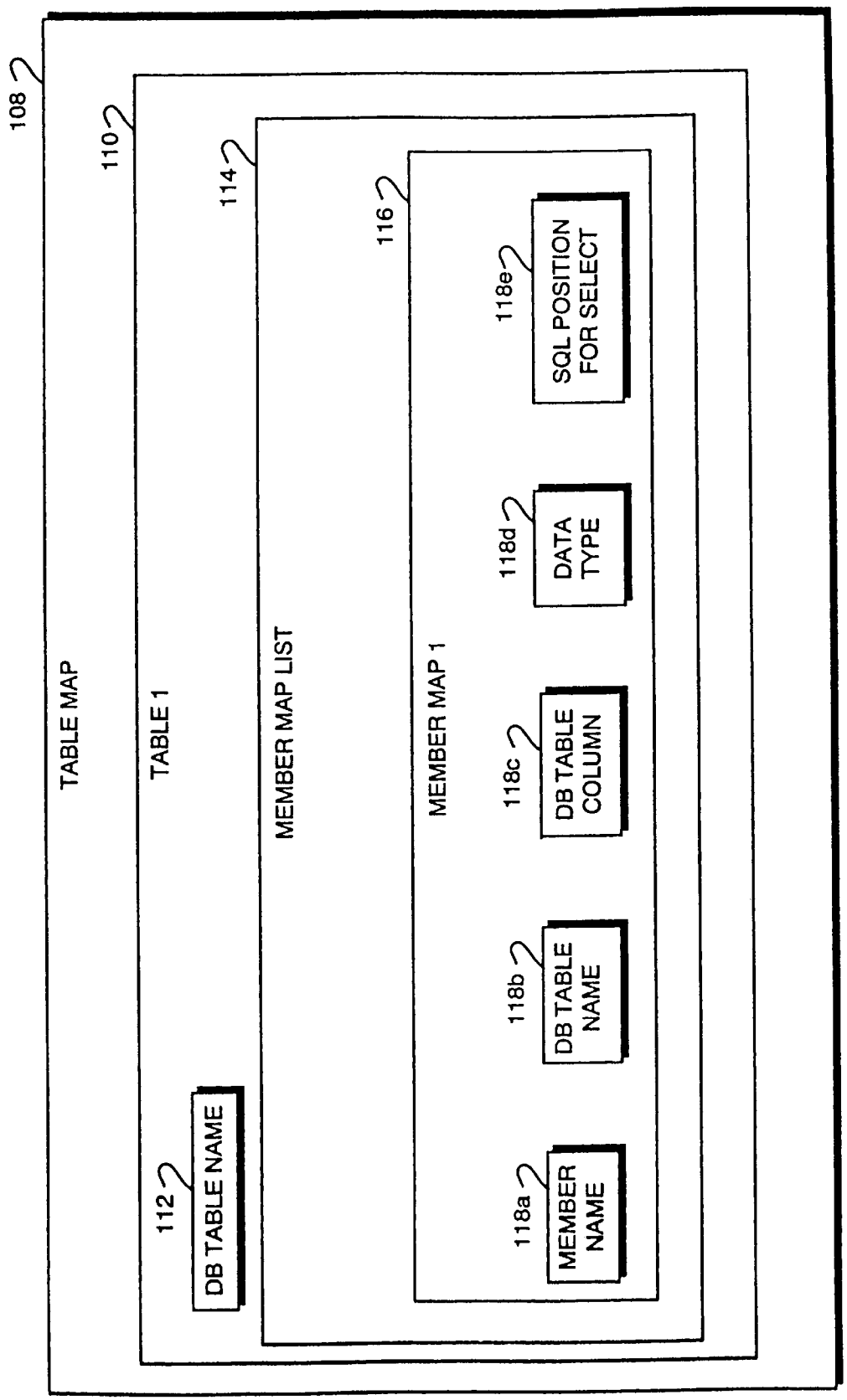
FIG. 6 is a diagrammatic representation of a map table of the present invention.
Figure 7:
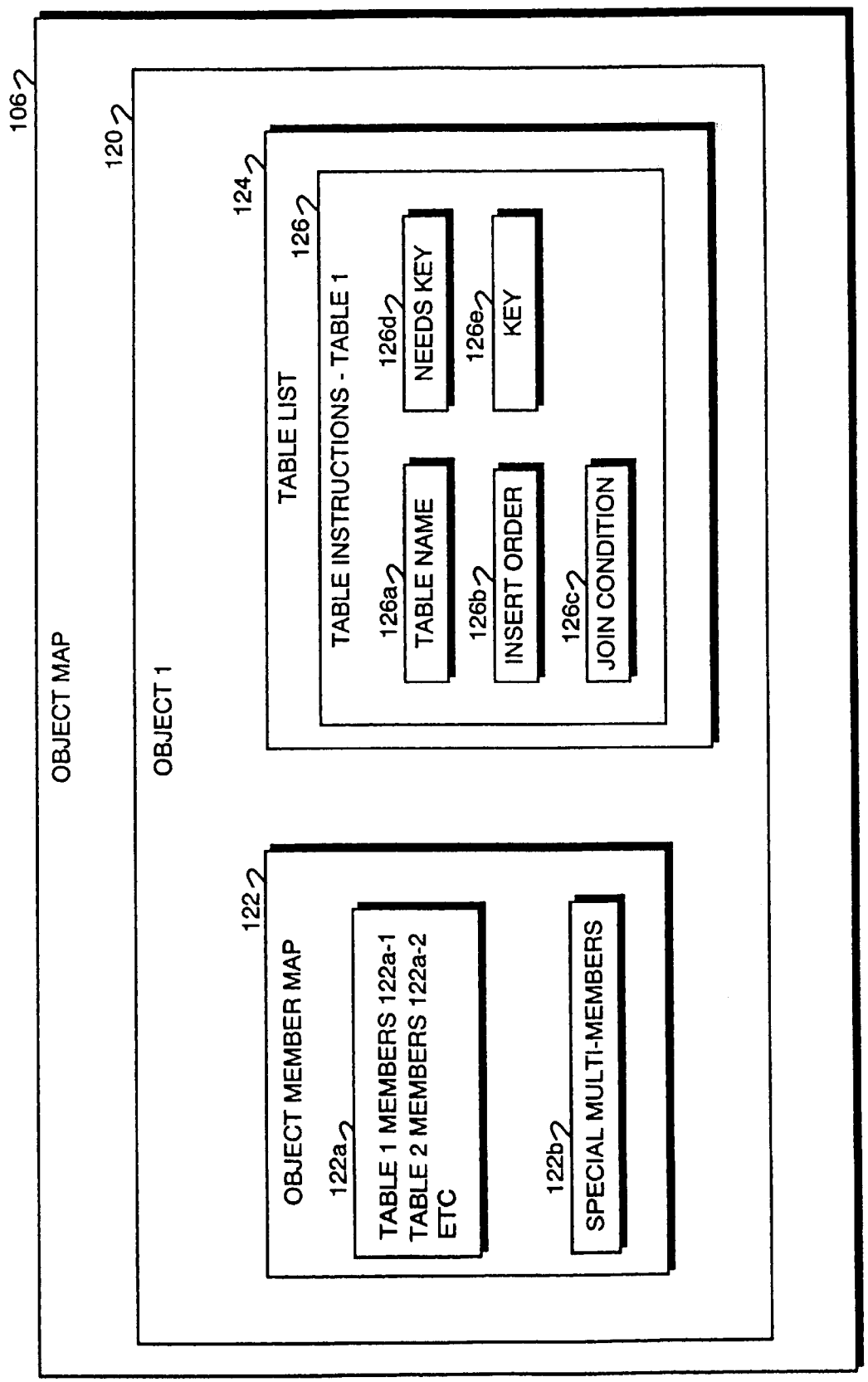
FIG. 7 is a diagrammatic representation of a bucket object map of the present invention.

C. Bucket Manager 38 (FIGS. 5, 6 and 7)

As described previously, the function of Bucket Manager 38 is to create Buckets 40 and Bucket Data Objects 42 in response to requests from Application Interfaces 30 and Bucket Manager 38 will create new Buckets 40 or Bucket Data Objects 42 when a new Bucket 40 or Bucket Data Object 42 is necessary to meet the requirements of a particular database request. As also described, the Bucket Mechanism 28 of the present invention stores the information necessary to create Bucket Data Objects 42, and Buckets 40, in a set of map objects, represented as Maps 46 in FIG. 2, which, as illustrated in FIG. 5, are implemented in the present embodiment as an Object Map 106 and a Table Map 108. Object Map 106 and Table Map 108 are constructed by the programmer, rather than by the user of the system, for each Database 20A–n currently known and used by the system and, the information being stored as maps and tables, may be easily modified to add subsequent new databases or data objects to the system.

Figure 5:
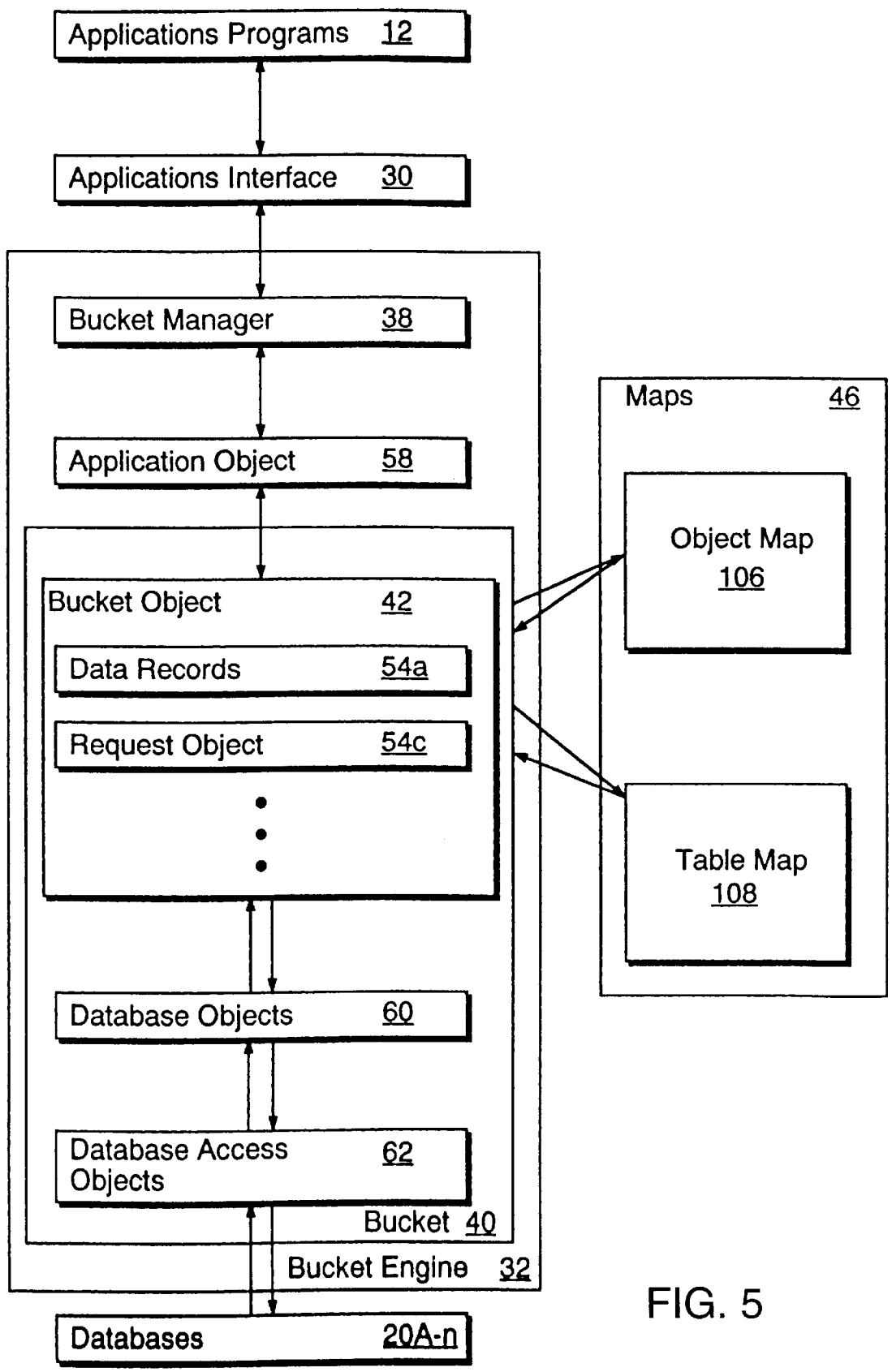
FIG. 5 is a detailed diagrammatic representation of the present invention illustrating the construction of bucket objects.

Referring to FIG. 5, therein is shown a diagrammatic representation of a System 10 incorporating the present invention and with the functional structures and operations of Bucket Engine 32 illustrated in further detail and including the maps and tables used in construction of Bucket Data Objects 42. As has been discussed previously, the Bucket 40 includes a set of Maps 46 containing the information necessary to create Bucket Data Objects 42, the components thereof and elements associated with Bucket Data Objects 42. As shown in FIG. 5, the information contained in Maps 46 resides in Object Map 106 and in Table Map 108. As will be described below, Object Map 106 is essentially a mapping between a Bucket Data Object 42 and the tables of Databases 20 while Table Map 108 is essentially a map relating the Bucket Data Object 42 to the columns of a table of a Database 20.

For example, and referring to the example used through the present descriptions by way of illustration, the request may have originated from Patient Demographics Application Program 20B, so that Bucket Engine 32 would respond by creating a Patient Bucket 40a and a Bucket Data Object 42a and the database members that would appear in the Demographic Bucket Data Object 42 would include the patient's first, middle and last names, address, and so on.

Object Map 106 would contain information corresponding to a Demographics Bucket Data Object 42a and Table Map 108 would include information corresponding to each type of patient demographic data.

Referring to FIG. 6, as illustrated therein Table Map 108 includes a Table 110 for and corresponding to each database table contained in Databases 20A–n, wherein each Table 110 includes a Database (DB) Table Name 112 and a Member Map List 114 containing a Member Map 116 for each member of a corresponding Database 20 table containing data that appears in the corresponding Bucket Data Object 42. Each Member Map 116, in turn, includes a Member Name 118a identifying the particular member corresponding to the Member Map 116 and a Database (DB) Table Name 118b identifying the database table containing the member. Each Member Map 116 further includes a Database (DB) Table Column 118c identifying the database column containing the corresponding member, a Data Type 118d identifying the type of data comprising the member, such as numeric or character string, and a SQL Position for Select 118e identifying the location of the member in the identified column.

Referring to FIG. 7, as illustrated therein Object Map 106 is a list that includes an Object 120 for and corresponding to each Bucket Data Object 42 wherein each Object 120 includes an Object Member Map 122 and a Table List 124. Each Object Member Map 122, in turn, contains a Member List 122a that is a concatenated list of all members of the Database 20 included in the Bucket Data Object 42. As indicated, Member List 122a contains entries, indicated as Table Members 122a-1, 122-a-2, and so on, corresponding to and identifying each member of a Database 20 table of the Bucket Data Object 42. Object Member Map 122 may also contain a Special Multi-members List 122b identifying sets of multiple members belonging to the Bucket Data Object 42.

Table List 124, in turn, contains a Table Instructions 126 for and corresponding to each Table 110 included in Table Map 108. As illustrated therein, each Table Instructions 126 includes a Table Name 126a identifying the corresponding table and an Insert Order 126b defining the order in which the tables are inserted into or deleted from membership and a Join Conditions 126c defining how the member tables are to be joined. Each Table Instructions 126 further includes a Needs Key 126d flag that indicates whether a new and unique table identifier is required before a table can be inserted, and a Key 126e that contains the corresponding key, if any.

Referring again to FIG. 5 to consider the operation of Bucket Engine 32, an Applications Program 12, operating though an Application Interfaces 30 issues a call for a database operation, in this example resulting in the creation of a new Bucket Data Object 42. Bucket Manager 38 receives the request through Application Interfaces 30, selects a Bucket 40 corresponding to the Applications Program 12 and requested data, and calls create bucket object methods of the Bucket 40 to create the Bucket Data Object 42.

The create bucket object methods of Bucket 40 access Maps 46 and, in particular, the Object Map 106 corresponding to the type of Bucket Data Object 42 to be created. From that Object Map 106, Bucket Manager 38 identifies and locates the conditions applying to the corresponding type of Bucket Data Object 42, the methods for operating upon and for by operations by the corresponding type of Bucket Data Object 42, and the Table Map 108 information to be used in constructing the Bucket Data Object 42.

Bucket Manager 38 then uses this information to construct the Bucket Data Object 42 and the associated Database Objects 52 and Database Access Objects 62. Using these constructs and information, Bucket Manager 38 then accesses Databases 20A–n to obtain the data to appear in the Bucket Data Object 42, through the path comprised of Bucket Data Object 42, Database Objects 52, Database Access Objects 62 and Databases 20A–n and the corresponding return path, as indicated in FIG. 5, and stores the resulting data for the requesting Applications Program 12.

As has been described in the above, subsequent requests pertaining to the same data from other Applications Programs 12 will not result in the construction of a new Bucket Data Object 42, but will be executed by shared access of the Bucket Data Object 42 containing the information.

Figure 8A:
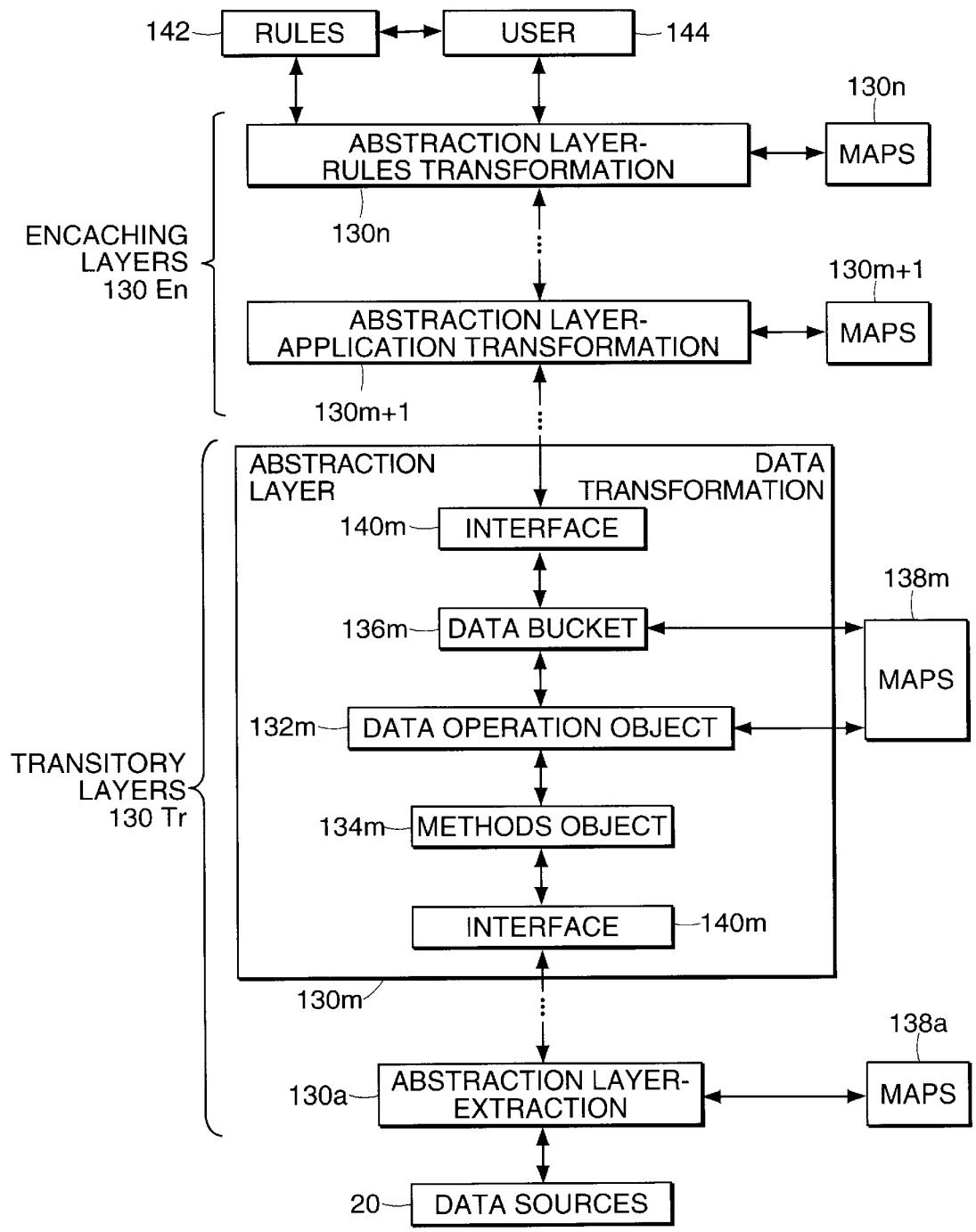
FIG. 8A is a block diagram of a multi-layer abstraction bucket mechanism.
Figure 8B:
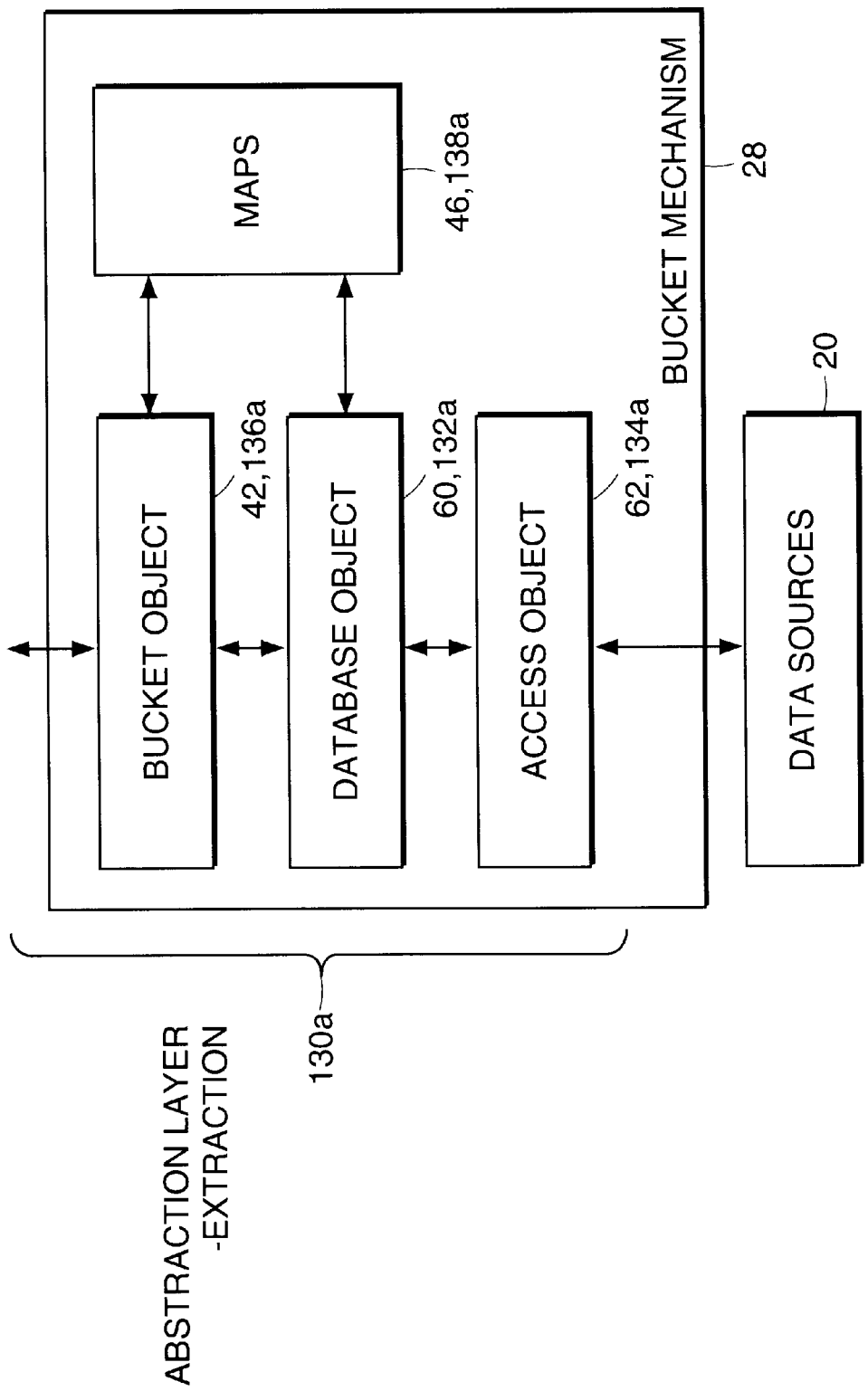
FIG. 8B is a block diagram of a single layer of a multi-layer abstraction bucket mechanism implemented as a bucket mechanism; and, FIG. 9 is shown a block diagram of a multiple layer bucket mechanism system.
Figure 9:
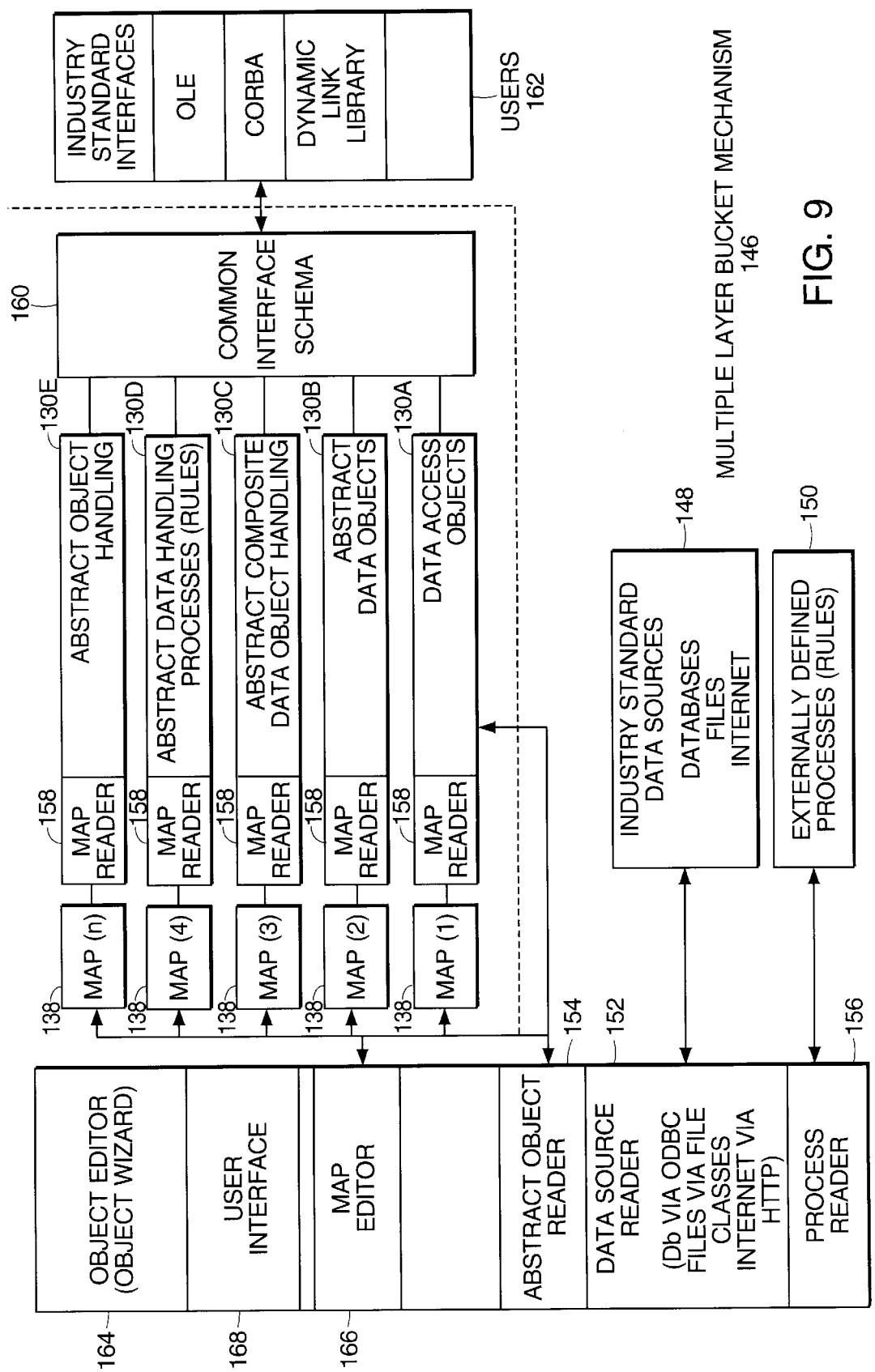

D. Multi-Layered Abstraction of Data (FIGS. 8A, 8B and 9)

To summarize the above descriptions of the bucket mechanism of the present invention, the bucket mechanism includes a bucket engine connected between one or more application programs and to one or more sources of original data, such as one or more databases for extracting data from the data sources and providing the data to the user, that is, applications programs.

As has been described, the bucket engine is responsive to data requests from the application programs for generating corresponding buckets wherein each bucket corresponds to a class of data members from the original data sources that have been requested by an application program. Each bucket includes a bucket data object for storing related data members retrieved from a data source and an access object that responds to a data request by retrieving the requested data member from the source and storing the requested data member in a corresponding bucket data object. The bucket engine then provides the requested data member stored in the corresponding bucket data object to the applications programs.

As has also been described, the bucket mechanism relates the original data requests to the original data source and the operations that must be performed to extract the data and provide the extracted data to the application programs by mapping of the data and the data processing methods. That is, the bucket mechanism includes a database object that maps each data request to data source access methods stored in the access object and contains maps, such as an object map and a table map, relating the requested data to the data in the original data sources that are used by the bucket engine in constructing buckets and bucket data objects.

It may be seen from the above descriptions that the bucket mechanism of the present invention is thereby a mechanism for the abstraction of data, that is, for extracting data from an original source and transforming that data into a different form that is of more direct use to a user of the system, wherein the rules for abstracting and transforming the data are defined in the maps.

In the bucket mechanism as described above, this abstraction process is essentially a single layer process wherein data is extracted from one or more original sources, assembled into one or more buckets, and provided in the buckets to the user, that is, the application programs, in essentially one process, or layer of abstraction from the original data source. As will be described next below, this concept may be expanded according to the present invention to provide the multi-layer abstraction and transformation of both the form of the data and the processes performed with or upon the data.

The operation of a multi-layer abstraction bucket mechanism according to the present invention is illustrated in FIG.

8A wherein a generalized Multi-layer Abstraction Bucket Mechanism 128 is shown as comprised of a plurality of Abstraction Layers 130a through 130n. Each of Abstraction Layers 130 is generally similar to the previously described single layer Bucket Mechanism 28 and reference may be made to the previous descriptions of Bucket Mechanism 28 for detailed discussions of the structures and operation of Abstraction Layers 130.

As illustrated in FIG. 8A, each Abstraction Layer 130m includes a Data Operation Object 132m that acts through data operation methods residing in a Methods Object 134m to execute a specified operation or operations upon data received from a Data Bucket 136m-1 in the next lower Abstraction Layer 130m-1. The method used for each specified operation is selected under the guidance and control of a Maps 138m, which relates requested or specified operations on the data to corresponding methods residing in the Methods Object 134m, and the results of the operations on the data are stored in a Data Bucket 136m that is created according to information stored in the Maps 138m and is passed to the next higher Abstraction Layer 130m+1.

Referring to FIG. 8B and considering, for example, the lowest Abstraction Layer 130, designated in this example as Abstraction Layer 130a, this layer maybe comprised of an implementation of the single layer Bucket Mechanism 28 previously described in detail. As shown and as previously discussed with regard to FIGS. 1 through 7, this Abstraction Layer 130 is connected to the Data Sources 20 and provides the first layer of data transformation, for example and as described previously, the extraction of data from Databases 20 or other data sources. As has been described with reference to FIGS. 1 through 7, and inserting the same reference numerals as used with regard to the descriptions regarding FIGS. 1 through 7, Bucket Mechanism 28 includes a Database Object 60 that acts through the database access methods residing in an Access Object 62 and under the guidance of the methods specified in a Maps 46 to extract data from one or more original data sources, such as Databases 20. Database Object 60 assembles the extracted data into one or more Bucket Objects 42 that are constructed according to the information residing in Maps 46, and passes the Bucket Objects 42 to the next higher Abstraction Layer 130 of generalized Multi-layer Abstraction Bucket Mechanism 128.

Finally, it will be seen from FIG. 8A and from the previous descriptions of an exemplary Abstraction Layer 130, that is, Bucket Mechanism 28, that Abstraction Layers 130 must intercommunicate for the transfer of commands or requests, responses and data between the Abstraction Layers 130 and between Abstraction Layers 130 and other elements of the system, while will be described further in a following description. In a presently preferred embodiment, communication with and between Abstraction Layers 130 is through a uniform interface convention, such as a set of standardized remote procedure calls and responses and mutually compatible data formats. The use of common communication conventions between Abstraction Layers 130, in turn, allows Abstraction Layers 130 to be shared and re-used among and by users and applications.

In alternate embodiments, communication with and between Abstraction Layers 130 may be through Interfaces 140, which transform each Abstraction Layer 130's internal data and command formats into either common formats accepted by the Interfaces 140 of all other Abstraction Layers 130 or formats accepted by those Abstraction Layers 130 intended to operate with a given Abstraction Layer 130. While the latter embodiment is more complex than the use of a common communication format, the use of Interfaces 140 provides a greater degree of isolation between the internal operations and formats of each of Abstraction Layers 130, so that the internal design of each Abstraction Layer 130 is effectively unconstrained by the internal operations and formats of other Abstraction Layers 130.

As indicated in FIG. 8A and is apparent from the above discussion, each Abstraction Layer 130 may transform the form of the data passed from one Abstraction Layer 130. Each Abstraction Layer 130 may also perform a different process with or upon the data, thereby effectively transforming not only the form of the data but the nature of the process or operation performed with the data, and thereby the nature or function of Multi-layer Abstraction Bucket Mechanism 128, at each Abstraction Layer 130. For example, the first Abstraction Layer 130, designated in FIG. 8A as Abstraction Layer—Extraction 130a, performs the data abstraction function of extracting requested data from original data sources and reassembling the extracted data into a different organization, such as by type but in the same format, as described previously with regard to Bucket Mechanism 28, before passing the data to the next Abstraction Layer 130.

A higher Abstraction Layer 130, designated in FIG. 8A as Abstraction Layer—Data Transformation 130m, may in turn perform a data transformation operation on the data, such as transforming the format or logical schema of the data. For example, Abstraction Layer 130m may transform the data from hexadecimal format to binary coded decimal format and may reorganize the data, for example, from a patient schema to a medical procedure or medication schema or a medical department schema.

A yet higher Abstraction Layer 130, designated in FIG. 8A as Abstraction Layer—Application Transformation 130m+1, may in turn perform a processing operation on the data to transform the data into new data. For example, Abstraction Layer 130m+1 may perform an application program operation on the data, such as creating a spreadsheet or graph from the data, making a financial projection, analyzing a set of medical tests to propose a diagnosis on a patient, and so on.

A still higher Abstraction Layer 130, designated in FIG. 8A as Abstraction Layer—Rules Transformation 130n, may in turn perform a rules based decision operation based upon the processed data and a set of Rules 142 provided by a User 144 wherein Rules 142 comprise a set of data dependent guidelines, preferences or rules for decision making. For example, in a medical application Rules 142 may indicate medications to be given or tests to be performed for various conditions or test results represented by the data provided to Abstraction Layer 130n, or buy/sell orders to be placed depending upon the performance of selected financial and investment factors represented by the data. In this regard, it should be noted that Rules 142 may be provided to lower level Abstraction Layers 130, such of Abstraction Layers 130m or 130m+1 where user choice may be a factor in the form in which the data is presented or is to be operated upon and the processes that are to be performed on the data before the decision making processes.

It will again be noted that, in each Abstraction Layer 130 the operations that may be performed by an Abstraction Layer 130 are determined by the methods stored in the Abstraction Layer 130's Methods Object 134, while the specific operations that are performed by an Abstraction Layer 130 in response to a request or command and the structure and format of the Bucket 136, that is, the data output of the Abstraction Layer 130, are controlled by entries in Maps 138. A Methods Object 134 may therefore contain a set of methods sufficient for the Abstraction Layer 130 to satisfy to meet the needs of a plurality of users and applications, thereby facilitating the use and sharing of a given Abstraction Layer 130 by and among a plurality of users and applications. The operations performed by an Abstraction Layer 130 and the forms of the Abstraction Layer 130's data output may be adapted for a specific user or application, however, by the association of a corresponding Maps 138 with the Abstraction Layer 130, thereby facilitating the adaptation of a given Abstraction Layer 130 for a specific purpose of function.

It should also be noted that the use of multiple Abstraction Layers 130 in a Multi-layer Abstraction Bucket Mechanism 128 as illustrated in FIG. 8A allows Abstraction Layers 130 to be further distinguished, and defined, according to whether the residency of data in each layer each transitory or encached.

For example, and referring to the exemplary mechanism shown in FIG. 8A, the functions of Abstraction Layer—Extraction 130a through Abstraction Layer—Data Transformation 130m are, respectively, the extraction of data from an original source and the transformation of the data into a different format. As such, and because of the nature of the operations performed with on upon the data in these layers, data is resident in each of Abstraction Layers 130a and 130m only on a transitory basis, that is, while it is being operated upon, and is generally passed to the next Abstraction Layer 130 when the operation is completed.

In contrast, Abstraction Layer—Application Transformation 130m+1 through Abstraction Layer—Rules Transformation 130n, may perform one or more processing operations on the data, respectively transforming the data into new data and performing a rules based decision operation, and generally will retain the data so that the data is available for subsequent requests or additional operations. Because of the nature of the operations performed by these layer, the data is therefore generally resident in these layers for an extended period and is thereby effectively encached in the layers.

As such, and because of the operations or functions defined for the various Abstraction Layers 130, certain of Abstraction Layers 130 may be defined as Transitory Layers 130Tr while others of Abstraction Layers 130 may be defined as Encaching Layers 130En.

Referring now to FIG. 9, therein is shown a block diagram of a Multiple Layer Bucket Mechanism System 146. As illustrated therein, a Multiple Layer Bucket Mechanism System 146 may be connected from a plurality of Industry Standard Data Sources 148 and may be provided with a source of Externally Defined Processes or Rules 150. Industry Standard Data Sources 148 are the sources of original data and generally conform to industry-wide or commonly accepted standards and may include, for example, Databases 20, files of various forms residing, for example, in mass storage devices, and networks, such as the internet. Externally Defined Processes or Rules 150 are, for example, the sources of user or application defined rules and processes for transforming or otherwise operating on data or rules for decision making processes, as discussed above with regard to Rules 142 and User 144.

As shown, a Multiple Layer Bucket Mechanism System 146 will include a Data Source Reader 152 that will include a set of interfaces and drivers for accessing Industry Standard Data Sources 148 and reading the original data from Industry Standard Data Sources 148 and an Abstract Object Reader 154 for reading and organizing the data from Industry Standard Data Sources 152. Data Source Reader and Abstract Object Reader 154 will generally operate under the control of the lowest level Abstraction Layer 130, that is, the data extraction layer, unless the extraction of data from the original sources requires guidance of decisions from a higher level Abstraction Layer 130, whereupon commands or requests will be provided from the higher level as required, either directly or through the lower levels.

As indicated, Multiple Layer Bucket Mechanism System 146 may also include a Process Reader 156 for reading or obtaining the processes or rules defined in Externally Defined Processes or Rules 150 and providing those processes or rules to the appropriate Abstraction Layers 130.

As indicated in FIG. 9, Multiple Layer Bucket Mechanism System 146 includes a plurality of Abstraction Layers 130, each of which is provided with an associated Maps 138 and a Map Reader 158 for reading the associated Maps 138 upon receiving a request or command.

It will be understood by those of ordinary skill in the relevant arts that the number and functions of Abstraction Layers 130 in a given Multiple Layer Bucket Mechanism System 146 will vary with and depend upon the functions and operations performed by the given Multiple Layer Bucket Mechanism System 146. As such, the Abstraction Layers 130 represented in FIG. 9 will be understood to be represented generically and generally and not as represented a particular embodiment of a Multiple Layer Bucket Mechanism System 146 or as limiting possible arrangements and functions of the Abstraction Layers 130 in a particular Multiple Layer Bucket Mechanism System 146. As such, the exemplary Abstraction Layers 130 illustrated in FIG. 9 as shown as possibly including a Data Access Layer 130A for extracting data from the original sources, an Abstract Data Layer 130B for organizing and formatting the data, an Abstract Composite Data Handling Layer 130C for combining and processing data from a number of sources, a Data Handling and Rules Layer 130D for further processing steps, including rules based decision making, and an Abstract Object Handling Layer 130E for performing function and operations based on the results of the operations performed in Data Handling and Rules Layer 130D.

As indicated in FIG. 9, the results of the operations at any of Abstraction Layers 130 may be provided through a Common Interface Schema 160 to any of a number of possible destinations or users, generally indicated as Users 162, that may include both human users and the operational elements of other systems.

Finally, and as illustrated, Multiple Layer Bucket Mechanism System 146 will also generally include an Object Editor 164 for creating, defining and editing Bucket Objects 42, wherein Object Editor 164 is implemented as a "wizard" type program in the presently preferred embodiment, a Map Editor 166 for creating and editing Maps 138, and a User Interface 168.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. For use in a computer system including a processor for performing operations on data and a memory for storing programs for controlling operations of the processor and the data, a multi-layer abstraction bucket mechanism connected between applications programs executing on the computer under direction of users and at least one data source containing data for providing access to the data by the users and providing to the users transformations of data and of processes performed on the data, comprising:

a plurality of hierarchically connected abstraction layers, each abstraction layer including a methods object for storing methods for operating on data and performing corresponding operations on data received from a data bucket of a hierarchically next lower abstraction layer, a data operation object responsive to a request for an operation to be performed on the data received from the next lower abstraction layer for selecting a corresponding method to be executed by the method object, a data bucket for storing the results of a method executed by the methods object and providing the results as data to a hierarchically next higher abstraction layer, and a map connected to the data operation object and to the methods object for storing information for constructing the data bucket and for relating requests for operations to methods residing in the methods object.

2. The multi-layer abstraction bucket mechanism of claim 1, wherein:

an abstraction layer is a data extraction layer connected from at least one data source for receiving data from the at least one data source, and the methods object of the data extraction layer includes methods for extracting data from the at least one data source.

3. The multi-layer abstraction bucket mechanism of claim 1, wherein:

an abstraction layer is connected to provide the results stored in the data bucket thereof to a user.

4. The multi-layer abstraction bucket mechanism of claim 1, wherein:

at least one abstraction layer is a data transformation layer and contains and executes methods for performing data transformation operations upon data received from the next lower abstraction layer.

5. The multi-layer abstraction bucket mechanism of claim 1, wherein:

at least one abstraction layer is a data processing layer and contains and executes methods for performing data processing operations upon data received from the next lower abstraction layer to generate new data from the data received from the next lower abstraction layer.

6. The multi-layer abstraction bucket mechanism of claim 1, wherein:

at least one abstraction layer is a rules transformation layer and contains and executes methods for performing rule based decision operations upon data received from the next lower abstraction layer.

7. The multi-layer abstraction bucket mechanism of claim 1, further including:

a set of user defined rules for performing the rule based decision operations.

8. The multi-layer abstraction bucket mechanism of claim 1, wherein:

at least one abstraction layer is an encaching layer wherein the results of an operation performed on data from a next lower abstraction layer are stored in the data object for use in a plurality of operations by the abstraction layer.

9. The multi-layer abstraction bucket mechanism of claim 2, further including:

a data source reader connected between the data extraction layer and the at least one data source for reading the data from the at least one data source.

10. The multi-layer abstraction bucket mechanism of claim 1, further including:

a set of externally defined rules defining processes to be performed on data by at least one abstraction layer, and a process reader for reading the set of externally defined rules and providing the externally defined rules to the at least one abstraction layer.

11. The multi-layer abstraction bucket mechanism of claim 1, further including:

an interface schema for providing the results from at least one abstraction layer to a plurality of users.

12. The multi-layer abstraction bucket mechanism of claim 1, further including:

an object editor for defining and editing data buckets.

13. The multi-layer abstraction bucket mechanism of claim 1, further including:

a map editor for defining and editing the maps.

* * * * *